US008935210B2

(12) United States Patent
Kottomtharayil (10) Patent No.: US 8,935,210 B2
(45) Date of Patent: Jan. 13, 2015

(54) SYSTEMS AND METHODS FOR PERFORMING REPLICATION COPY STORAGE OPERATIONS

(71) Applicant: CommVault Systems, Inc., Oceanport, NJ (US)

(72) Inventor: Rajiv Kottomtharayil, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 14/261,789

(22) Filed: Apr. 25, 2014

(65) Prior Publication Data
US 2014/0236900 A1 Aug. 21, 2014

Related U.S. Application Data

(63) Continuation of application No. 13/887,103, filed on May 3, 2013, now Pat. No. 8,725,694, which is a continuation of application No. 13/235,292, filed on Sep. 16, 2011, now Pat. No. 8,463,751, which is a continuation of application No. 12/581,297, filed on Oct. 19, 2009, now Pat. No. 8,024,294, which is a continuation of application No. 11/313,257, filed on Dec. 19, 2005, now Pat. No. 7,606,844.

(51) Int. Cl.
*G06F 17/30* (2006.01)
(52) U.S. Cl.
CPC ............................ *G06F 17/30575* (2013.01)
USPC .......................................... 707/640; 711/162
(58) Field of Classification Search
USPC .......................................... 707/640; 711/162
See application file for complete search history.

(56) References Cited

U.S. PATENT DOCUMENTS

| 4,296,465 A | 10/1981 | Lemak |
| 4,686,620 A | 8/1987 | Ng |
| 4,995,035 A | 2/1991 | Cole et al. |

(Continued)

FOREIGN PATENT DOCUMENTS

| AU | 2006331932 | 12/2006 |
| CA | 2632935 | 12/2006 |

(Continued)

OTHER PUBLICATIONS

U.S. Appl. No. 14/038,540, filed Sep. 26, 2013, Erofeev.

(Continued)

*Primary Examiner* — Joshua Bullock
(74) *Attorney, Agent, or Firm* — Knobbe, Martens, Olson & Bear, LLP (57) ABSTRACT

A system and method are provided for performing storage operations relating to a first secondary copy of electronic data. A storage policy or storage preferences may dictate that a replication copy should be used in storage operations performed to a particular client, sub-client, data, media or other item. Based on the storage policy, when a new client, sub-client, data, media or other item is received, a media agent determines whether there is a replication copy of the item. In the absence of a replication copy, one may be created. The replication copy may be provided by a third party application, or created by the client or a storage management system component. Information regarding the replication copy and its corresponding first secondary copy may be stored in a database. To optimize use of system resources, storage operations relating to the first secondary copy may be performed using the replication copy instead of the first secondary copy.

20 Claims, 6 Drawing Sheets

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,231,668 A | 7/1993 | Kravitz |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,606,693 A | 2/1997 | Nilsen et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,668,986 A | 9/1997 | Nilsen et al. |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem et al. |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |

(56) References Cited

U.S. PATENT DOCUMENTS

| | | |
|---|---|---|
| 6,434,681 B1 | 8/2002 | Amangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,564,229 B1 | 5/2003 | Baweja et al. |
| 6,564,271 B2 | 5/2003 | Micalizzi, Jr. et al. |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 | 2/2006 | Manley et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,111,189 B1 | 9/2006 | Sicola et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 | 2/2007 | Holenstein et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,194,487 B1 | 3/2007 | Kekre et al. |
| 7,200,620 B2 | 4/2007 | Gupta |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,363,444 B2 | 4/2008 | Ji |
| 7,370,232 B2 | 5/2008 | Safford |
| 7,373,364 B1 | 5/2008 | Chapman |
| 7,380,072 B2 | 5/2008 | Kottomtharayil et al. |
| 7,383,293 B2 | 6/2008 | Gupta et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |

(56) References Cited

U.S. PATENT DOCUMENTS

| | | |
|---|---|---|
| 7,409,509 B2 | 8/2008 | Devassy et al. |
| 7,415,488 B1 | 8/2008 | Muth et al. |
| 7,428,657 B2 | 9/2008 | Yamasaki |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,457,980 B2 | 11/2008 | Yang et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,673,000 B2 | 3/2010 | Smoot et al. |
| 7,685,126 B2 | 3/2010 | Patel et al. |
| 7,689,467 B1 | 3/2010 | Belanger et al. |
| 7,694,086 B1 | 4/2010 | Bezbaruah et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,809,691 B1 | 10/2010 | Karmarkar et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,455 B2 | 6/2011 | Erofeev |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,195,623 B2 | 6/2012 | Prahlad et al. |
| 8,204,859 B2 | 6/2012 | Ngo |
| 8,219,524 B2 | 7/2012 | Gokhale |
| 8,271,830 B2 | 9/2012 | Erofeev |
| 8,285,684 B2 | 10/2012 | Prahlad et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 8,572,038 B2 | 10/2013 | Erofeev |
| 8,589,347 B2 | 11/2013 | Erofeev |
| 8,655,850 B2 | 2/2014 | Ngo et al. |
| 8,656,218 B2 | 2/2014 | Erofeev |
| 8,666,942 B2 | 3/2014 | Ngo |
| 8,725,694 B2 | 5/2014 | Kottomtharayil |
| 8,725,698 B2 | 5/2014 | Prahlad et al. |
| 8,726,242 B2 | 5/2014 | Ngo |
| 8,745,105 B2 | 6/2014 | Erofeev |
| 8,793,221 B2 | 7/2014 | Prahlad et al. |
| 8,868,494 B2 | 10/2014 | Agrawal |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 | 7/2002 | Martin et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174139 A1 | 11/2002 | Midgley et al. |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |

(56) References Cited

U.S. PATENT DOCUMENTS

| | | |
|---|---|---|
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dairymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0158588 A1 | 8/2004 | Pruet |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0212639 A1 | 10/2004 | Smoot et al. |
| 2004/0215724 A1 | 10/2004 | Smoot et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |
| 2004/0267835 A1 | 12/2004 | Zwilling et al. |
| 2004/0267836 A1 | 12/2004 | Amangau et al. |
| 2005/0015409 A1 | 1/2005 | Cheng et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0055445 A1 | 3/2005 | Gupta et al. |
| 2005/0060613 A1 | 3/2005 | Cheng |
| 2005/0071389 A1 | 3/2005 | Gupta et al. |
| 2005/0071391 A1 | 3/2005 | Fuerderer et al. |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0036901 A1 | 2/2006 | Yang et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura et al. |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0059515 A1 | 3/2008 | Fulton |
| 2008/0077634 A1 | 3/2008 | Quakenbush |
| 2008/0077636 A1 | 3/2008 | Gupta et al. |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1 | 8/2008 | Lyon |
| 2008/0228987 A1 | 9/2008 | Yagi |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244205 A1 | 10/2008 | Amano et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0300079 A1 | 12/2009 | Shitomi |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2012/0011336 A1 | 1/2012 | Saika |
| 2013/0006938 A1 | 1/2013 | Prahlad et al. |
| 2013/0006942 A1 | 1/2013 | Prahlad et al. |
| 2014/0067764 A1 | 3/2014 | Prahlad et al. |
| 2014/0074777 A1 | 3/2014 | Agrawal |
| 2014/0164327 A1 | 6/2014 | Ngo et al. |

(56) References Cited

U.S. PATENT DOCUMENTS

| | | | |
|---|---|---|---|
| 2014/0181022 | A1 | 6/2014 | Ngo |
| 2014/0181029 | A1 | 6/2014 | Erofeev |
| 2014/0244586 | A1 | 8/2014 | Ngo |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2010/068570 | 6/2010 |

OTHER PUBLICATIONS

Armstead et al., "Implementation of a Campus-Wide Distributed Mass Storage Service: The Dream vs. Reality," IEEE, 1995, pp. 190-199.

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009, www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Calvert, Andrew, "SQL Server 2005 Snapshots", published Apr. 3, 2006, http:/www.simple-talk.com/contnet/print.aspx?article=137, 6 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray, et al. "Transaction processing: concepts and techniques" 1994, Morgan Kaufmann Publishers, USA, pp. 604-609, 646-655.B7.

Harrington, "The RFP Process: How to Hire a Third Party", Transportation & Distribution, Sep. 1988, vol. 39, Issue 9, in 5 pages.

http://en.wikipedia.org/wiki/Naive_Bayes_classifier, printed on Jun. 1, 2010, in 7 pages.

IBM, "Intelligent Selection of Logs Required During Recovery Processing", ip.com, Sep. 16, 2002, 4 pages.

IBM, "Near Zero Impact Backup and Data Replication Appliance", ip.com, Oct. 18, 2004, 5 pages.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Mangement approach using LSI and Domain specific Ontologies", FLAIRS-01 Proceedings, 2001, pp. 300-302.

Lyon J., Design considerations in replicated database systems for disaster protection, COMPCON 1988, Feb. 29, 1988, pp. 428-430.

Microsoft Corporation, "Microsoft Exchange Server: Best Practices for Exchange Database Management," 1998.

Park, et al., "An Efficient Logging Scheme for Recoverable Distributed Shared Memory Systems", IEEE, 1997, 9 pages.

Rosenblum et al., "The Design and Implementation of a Log-Structure File System," Operating Systems Review SIGOPS, vol. 25, No. 5, New York, US, pp. 1-15 (May 1991).

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Veritas Software Corporation, "Veritas Volume Manager 3.2, Administrator's Guide," Aug. 2001, 360 pages.

Wiesmann M, Database replication techniques: a three parameter classification, Oct. 16, 2000, pp. 206-215.

Final Office Action for Japanese Application No. 2003531581, Mail Date Mar. 24, 2009, 6 pages.

International Search Report and Written Opinion dated Nov. 13, 2009, PCT/US2007/081681.

First Office Action for Japanese Application No. 2003531581, Mail Date Jul. 8, 2008, 8 pages.

International Preliminary Report on Patentability, PCT Application No. PCT/US2009/066880, mailed Jun. 23, 2011, in 9 pages.

International Search Report and Written Opinion issued in PCT Application No. PCT/US2011/030396, mailed Jul. 18, 2011, in 20 pages.

International Search Report and Written Opinion issued in PCT Application No. PCT/US2011/38436, mailed Sep. 21, 2011, in 18 pages.

Canadian Office Action dated Sep. 24, 2012, Application No. 2,632,935, 2 pages.

European Examination Report; Application No. 06848901.2, Apr. 1, 2009, pp. 7.

Examiner's First Report; Application No. 2006331932, May 11, 2011 in 2 pages.

Canadian Office Action dated Dec. 29, 2010, Application No. CA2546304.

Examiner's Report for Australian Application No. 2003279847, Dated Dec. 9, 2008, 4 pages.

First Office Action in Canadian application No. 2,632,935 dated Feb. 16, 2012, in 5 pages.

International Search Report dated May 15, 2007, PCT/US2006/048273.

Second Examination Report in EU Appl. No. 06 848 901.2-2201 dated Dec. 3, 2010.

International Search Report and Written Opinion dated Mar. 25, 2010, PCT/US2009/066880.

International Preliminary Report on Patentability and Written Opinion in PCT/US2011/030396 mailed Oct. 2, 2012.

International Preliminary Report on Patentability and Written Opinion in PCT/US2011/038436 mailed Dec. 4, 2012.

International Search Report dated Dec. 28, 2009, PCT/US204/038324.

International Search Report and Written Opinion dated Jan. 11, 2006, PCT/US2004/038455.

Exam Report in Australian Application No. 2009324800 dated Jun. 17, 2013.

SYSTEMS AND METHODS FOR PERFORMING REPLICATION COPY STORAGE OPERATIONS

RELATED APPLICATION

Any and all applications for which a foreign or domestic priority claim is identified in the Application Data Sheet, or any correction thereto, are hereby incorporated by reference into this application under 37 CFR 1.57.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise expressly reserves all other rights to copyright protection.

BACKGROUND

1. Field of the Invention

The invention disclosed herein relates generally to performing storage operations on electronic data in a computer network. More particularly, the present invention relates to using a replication copy or other copy of primary storage production data for performing storage operations.

2. Description of the Related Art

Current storage management systems employ a number of different methods to perform storage operations on electronic data. For example, data can be stored in primary storage as a primary copy or in secondary storage as various types of secondary copies including, a backup copy, a snapshot copy, a hierarchical storage management copy ("HSM"), as an archive copy, and as other types of copies.

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event that a problem occurred with the data stored in primary storage.

Secondary copies include point-in-time data and are typically intended for long-term retention (e.g., weeks, months or years depending on retention criteria, for example, as specified in a storage policy as further described herein) before some or all of the data is moved to other storage or discarded. Secondary copies may be indexed so that users can browse and restore the data at another point in time. After certain primary copy data is migrated to secondary storage, a pointer or other location indicia such as a stub may be placed in the primary copy to indicate the current location of that data.

In conventional storage management systems, a secondary copy is typically produced by performing a storage operation, such as a backup, of production data, such as a primary copy. Creating such secondary copies typically requires taking the production data or primary copy offline so that it is inaccessible or unavailable to a client or other system component. In general, it is preferable to avoid taking a primary copy, and any components associated therewith, offline, however, if it is unavoidable, it is preferable to minimize the duration that the copies or components are offline. Storage operations that require the primary copy are typically scheduled overnight when the primary copy is less likely to be used by a client, which typically accesses the primary copy during daytime hours. Thus, the primary copy may often be unavailable, or access to the primary copy may be difficult to provide because it is frequently in use. In addition, storage management system components using the primary copy for storage operations may also be unavailable to perform other concurrent storage operations. Such systems may encounter bottlenecks in allocation of system resources to perform storage operations.

SUMMARY

Systems and methods are provided for performing a storage operation using a replication copy or other data source. In one embodiment, a method for performing a storage operation using a replication copy is provided in which a data item for a storage operation is identified, a storage policy associated with the data item is identified, and a data source of the data item may be determined to be available. The data source for performing the storage operation may be selected according to a criterion and the storage operation may be performed. The data source may be a first secondary copy or a replication copy. In general, the data source is determined by consulting a schedule of storage operations involving the data source. A storage manager or other system component may select the data source according to a criterion by calculating a metric weighing one or more priorities for storage operation preferences.

In another embodiment, a method for performing a storage operation using a replication copy is provided, in which a storage operation instruction is received. The storage operation instruction may include data identifying a data item with which to perform the storage operation. A storage policy may be received. The storage policy may indicate that a storage operation relating to the data item should be performed using a replication copy. The replication copy may be determined to be available and the storage operation may be performed using the replication copy.

In another embodiment, a method for optimizing storage operations in a storage management system is provided, in which, a storage operation request is received, the storage operation request identifying a data item with which to perform the storage operation. A database may be consulted to determine whether a replication copy of the data item is available. Using the replication copy of the data item to perform the storage operation may be determined to optimize resource use in the storage management system; and the storage operation may be performed using the replication copy.

In another embodiment, a storage management system for performing a storage operation, is provided including a storage management component communicatively coupled to a database; wherein the database includes a storage policy; a media agent communicatively coupled to the storage management component, a first secondary copy and a replication copy; wherein the storage management component is programmed to receive a storage operation request relating to the first secondary copy, consult the database to identify the replication copy that corresponds to the first secondary copy, and determine whether using the replication copy to perform the storage operation optimizes use of system resources; and wherein the media agent is programmed to perform the storage operation using the replication copy.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Systems and methods are provided herein for performing a storage operation using a replication copy. A replication copy may be a copy of a first secondary copy of production data (e.g., a primary volume), but may also be a copy of production data or a primary copy. A first secondary copy is an initial or first secondary copy of production data, or some other initial copy of the primary volume. The first secondary copy may be considered for data storage management purposes to include the same data as a primary copy. The first secondary copy may be stored to primary storage, which is a storage medium which provides relatively faster access than secondary storage, however, secondary storage medium may also be used for the first secondary copy. The first secondary copy may alternatively refer to any copy of electronic data which may be frequently accessed by one or more system components for client use or storage operation purposes, and for which utilization may need to be restricted, e.g., to avoid bottlenecks, to avoid interrupting client use, etc. In this case, the first secondary copy may be considered equivalent to a primary copy in that storage management systems may wish to minimize system utilization of the first secondary copy as it would for a primary copy.

Figure 1A:
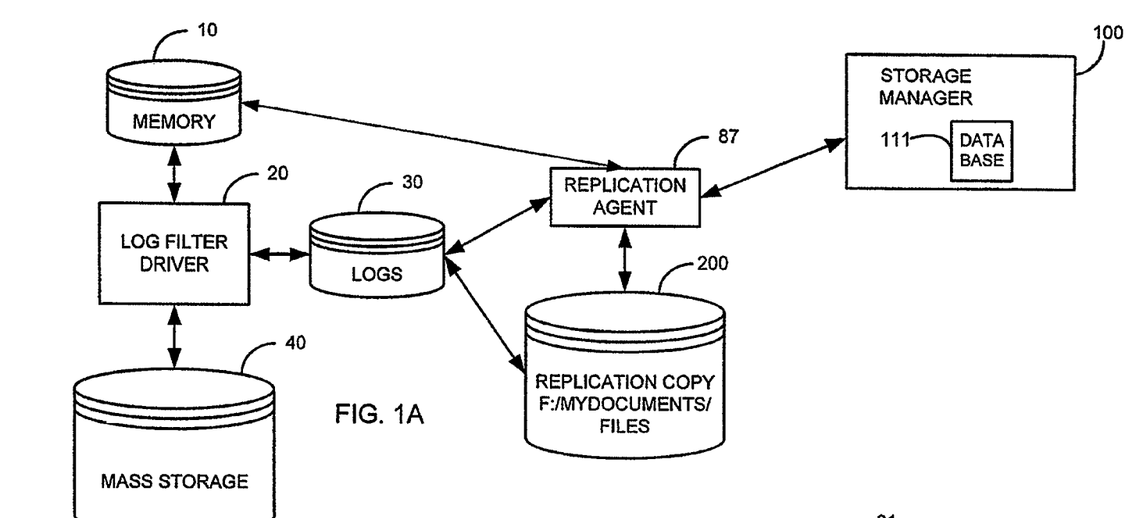
FIG. 1A is a block diagram of a storage management system for creating a replication copy according to an embodiment of the invention.

There are several ways to create a replication copy, such as by performing a copy operation, such as a snapshot copy, point in time copy, mirror copy, synchronous replication copy or asynchronous replication copy, or other copy operation. A replication copy is typically made of a first secondary copy and continuously updated. One example of a system for creating a replication copy is shown in FIG. 1A, but other system architectures may be used. As shown in FIG. 1A, a system for creating a replication copy may include system components such as a memory or data store 10, log filter driver 20, primary mass storage 40, logs 30, replication agent 87 and storage manager 100 and storage management index or database 111 and a replication copy 200.

In general, a replication copy 200 may be created at the direction of a replication agent 87, storage manager 100 or other system component, and information relating to the replication copy 200 may be stored in an index 111. The replication agent 87 may obtain the electronic data, such as from production data or a first secondary copy stored in memory 10, for the replication copy continuously via one or more data streams, or use logs 30 which include a production data log or change information obtained by the log filter driver 20, to update a replication copy periodically. The replication agent 87 may communicate with the log filter driver 20 to acknowledge receipt of logs 31 from a logs store or cache 30 or directly from the logs filter driver 20, and confirm that the replication copy 200 is updated with the received logs 31.

Figure 1B:
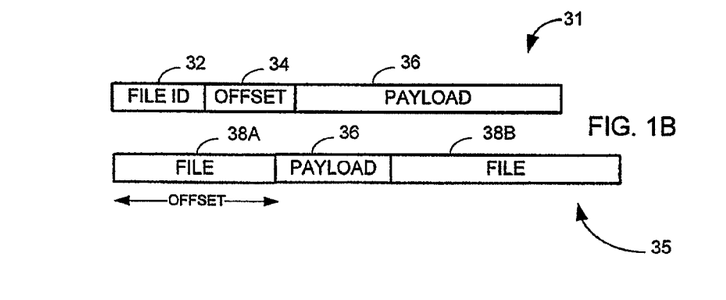
FIG. 1B is a diagram of a log and a file according to an embodiment of the invention.

Memory 10 may be a data store which is attached to a client or other data generator or data producer and which is capable of storing electronic data, such as production data or a first secondary copy, etc. A log filter driver 20 may be a module which monitors an interaction or change of electronic data in memory 10. The log filter driver 20 may be programmed to monitor particular or specific data changes, such as changes to a sub-client, application type, client folder, or other aspect of electronic data. Referring to FIG. 1B, the interaction or change may be stored in a log 31 which includes metadata, such as a file ID 32 and offset 34 and the changed data payload 36. A file ID 32 may be any file identifier and may correspond to a file 35. The offset 34 is the point at which the change to the file data occurs. Payload 36 typically includes the changed data. Thus, the file log 31 relates to the file 35 in that the payload 36 of the log 31 fits in the file 35 at a certain offset point, for example, between portions of the file 38A and 38B.

Referring again to FIG. 1A, the log filter driver 20 monitors the production data stored in memory 10 for interactions or changes to the electronic data and when a change occurs, the log filter driver 20 creates a log, such as log 31, which is stored in logs 30. A log file 31 may be cached temporarily in logs 30 or transmitted immediately to the replication copy 200 for updating the replication copy 200. Logs 30 may be any data store capable of storing the logs 31 generated by the log filter driver 20, and is generally in communication with a replication agent 87, replication copy 200, or other system component. The log filter driver 20 may also create logs 31 which may be used to create a primary copy or first secondary copy, stored in mass storage 40. The mass storage 40 may be any data store capable of storing electronic data, such as a primary copy, first secondary copy or other copy.

Figure 2:
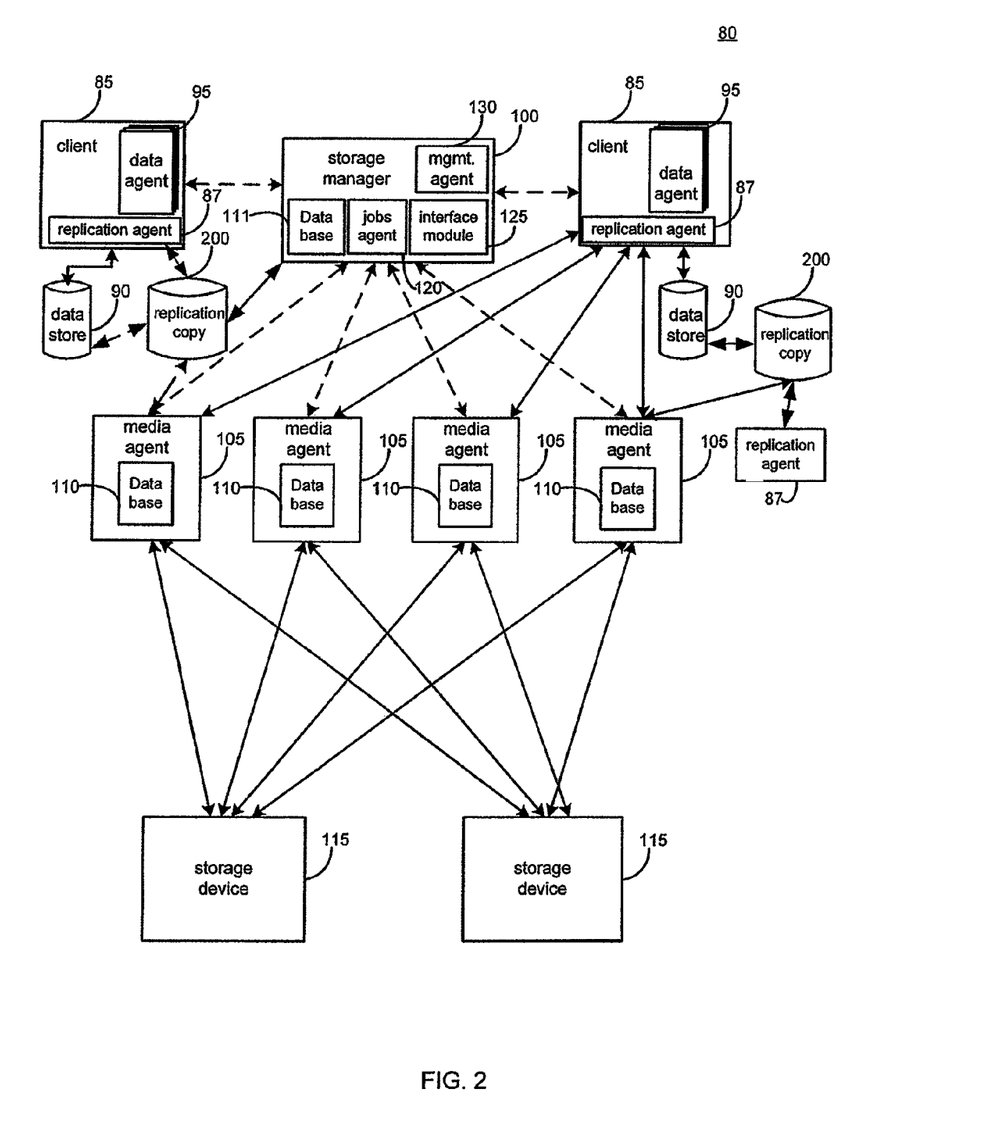
FIG. 2 is a block diagram of a storage management system according to an embodiment of the invention.

FIG. 2 illustrates a block diagram of a storage operation cell 80 that may perform storage operations on electronic data in a computer network in accordance with an embodiment of the present invention. As shown, storage operation cell 80 may generally include a storage manager 100, a data agent 95, a media agent 105, a storage device 115, and, in some embodiments, may include certain other components such as a client 85, a replication agent 87, a data or information store 90, databases or indexes 110 and 111, jobs agent 120, an interface module 125, and a management agent 130. Such system and elements thereof are exemplary of a modular storage management system such as the CommVault QINETIX system, and the CommVault GALAXY storage management system, available from CommVault Systems, Inc. of Oceanport, N.J., and further described in U.S. patent application Ser. No. 09/610,738 which is incorporated herein by reference in its entirety. A storage operation cell, such as cell 80, may generally include combinations of hardware and software components associated with performing storage operations on electronic data.

In accordance with certain embodiments of the present invention, storage operations performed by storage operation cells may include creating, storing, retrieving, and migrating primary data copies and secondary data copies (which may include, for example, snapshot copies, backup copies, HSM copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, relationships between system components and use of a third party application, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a replication copy or a specified number of streams, etc. A storage policy may be stored to a storage manager database or index 111, to archive media as metadata for use in restore operations or other storage operations, or to other locations or components of the system.

A schedule policy may specify when and how often to perform storage operations and may also specify performing certain storage operations on sub-clients of data and how to treat those sub-clients. A sub-client may represent static or dynamic associations of portions of data of a volume and are mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, a sub-client may be all media in an associated storage device and the sub-client is associated with a storage policy which requires that a replication copy be created or provided to perform secondary storage operations.

Storage operation cells may contain not only physical devices, but also may represent logical concepts, organizations, and hierarchies. For example, a first storage operation cell 80 may be configured to perform a storage operation, such as data backup or other types of data migration, and may include a variety of physical components including a storage manager 100 (or management agent 130), a media agent 105, a client component 85, and other components as described herein. A second storage operation cell may contain the same or similar physical components, however, it may be configured to perform other storage operations, such as monitoring a primary copy, first secondary copy, or replication copy volume or performing other known storage operations.

A storage preference may be a storage policy, user preference or other storage preference. In some embodiments the storage preference is defined by a system user or system administrator. In other embodiments, the storage preference is a default preference. Examples of storage preferences can include: using a particular data source for performing a storage operation, such as a replication copy, assigning priorities to performance of a storage operation, data security settings, encryption settings, data retention requirements, frequency of storage operations, such as frequency of backups, types of data for storage operations, such as data types for backups, types of storage operations to perform in the component group, network pathways, such as preferred network pathways to perform a storage operation, scheduling, such as a schedule of storage operations, reports, such as automatic generation of system reports regarding the group, which can include, for example the storage operations performed by the group, or other storage preference.

Replication agent 87 may be a software module or part of a software module that may be used to manage and direct creation and maintenance of a replication copy 200. For example, a replication agent 87 may communicate or direct communication of electronic data, such as production data for creating a replication copy 200. The replication copy 200 may be created synchronously or asynchronously, using a mirror, or other copy technique. The replication agent 87 may be a software module associated with a client 85 that generates the production data used to create replication copy 200. Alternatively, replication agent 87 may be provided by a third party software component which may interface with a client 85 and production data in, for example, data store 90, to create replication copy 200.

Data agent 95 may be a software module or part of a software module that is generally responsible for archiving, migrating, and recovering data from client computer 85 stored in an information store 90, or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Embodiments of the present invention may employ multiple data agents 95 each of which may backup, migrate, and recover data associated with a different application. For example, different individual data agents 95 may be designed to handle MICROSOFT EXCHANGE data, LOTUS NOTES data, MICROSOFT WINDOWS 2000 file system data, MICROSOFT ACTIVE DIRECTORY OBJECTS data, and other types of data known in the art. Other embodiments may employ one or more generic data agents 95 that can handle and process multiple data types rather than using the specialized data agents described above.

Generally speaking, storage manager 100 may be a software module or other application that coordinates and controls storage operations performed by storage operation cell 80. Storage manager 100 may communicate with some or all elements of storage operation cell 80 including client computers 85, data agents 95, media agents 105, and storage devices 115, to initiate and manage system storage operations.

Storage manager 100 may include a jobs agent 120 that monitors the status of some or all storage operations previously performed, currently being performed, or scheduled to be performed by storage operation cell 80. Jobs agent 120 may be communicatively coupled with an interface agent 125 (typically a software module or application). Interface agent 125 may include information processing and display software, such as a graphical user interface ("GUI"), an application program interface ("API"), or other interactive interface through which users and system processes can retrieve information about the status of storage operations. Through interface 125, users may optionally issue instructions to various storage operation cells 80 regarding performance of the storage operations as described and contemplated by the present invention. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device). As a further example, interface 125 may display the cost metrics associated with a particular type of data storage and may allow a user to determine overall and target cost metrics associated with a particular data type, or certain storage operation cell 80 or other storage operation as predefined or user-defined.

Storage manager 100 may also include a management agent 130 that is typically implemented as a software module or application program. In general, management agent 130 provides an interface that allows various management components 100 in other storage operation cells 80 to communicate with one another. For example, assume a certain network configuration includes multiple cells 80 adjacent to one another or otherwise logically related in a WAN or LAN configuration (not shown). With this arrangement, each cell 80 may be connected to the other through each respective interface module 125. This allows each cell 80 to send and receive certain pertinent information from other cells 80 including status information, routing information, information regarding capacity and utilization, etc. These communication paths may also be used to convey information and instructions regarding storage operations.

Storage manager 100 may also maintain an index cache, a database, or other data structure 111. The data stored in database 111 may be used to indicate logical associations between components of the system, user preferences, management tasks, some SRM or HSM data or other useful data. As further described herein, some of this information may be stored in a media agent database 110 or other local data store according to some embodiments. For example, the storage manager 100 may use data from database 111 to track logical associations of primary copies of data, first secondary copies of data and corresponding replication copies, between media agents 105 and storage devices 115 or between other components of the system.

Generally speaking, a media agent 105 may be implemented as a software module that conveys data, as directed by a storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to a particular storage device 115.

In operation, a media agent 105 associated with a particular storage device 115 may instruct the storage device to use a robotic arm or other retrieval means to load or remove a certain storage media, and to subsequently archive, migrate, or restore data to or from that media. Media agents 105 may communicate with a storage device 115 via a suitable communications path such as a SCSI or fiber channel communications link. In some embodiments, the storage device 115 may be communicatively coupled to a data agent 105 via a Storage Area Network ("SAN").

Each media agent 105 may maintain an index cache, a database, or other data structure 110 which stores index data generated during backup, migration, and restore and other storage operations as described herein. For example, performing storage operations on MICROSOFT EXCHANGE data may generate index data. Such index data provides a media agent 105 or other external device with a fast and efficient mechanism for locating data stored or backed up. Thus, in some embodiments, a storage manager database 111 may store data associating a client 85 with a particular media agent 105 or storage device 115, for example, as specified in a storage policy, while media agent database 110 may indicate where specifically the client 85 data is stored in storage device 115, what specific files were stored, and other information associated with storage of client 85 data. In some embodiments, such index data may be stored along with the data backed up in a storage device 115, with an additional copy of the index data written to index cache 110. The data in index cache 110 is thus readily available for use in storage operations and other activities without having to be first retrieved from the storage device 115.

In some embodiments, certain components may reside and execute on the same computer. For example, in some embodiments, a client computer 85 such as a data agent 95, a media agent 105, or a storage manager 100 coordinates and directs local archiving, migration, and retrieval application functions as further described in U.S. patent application Ser. No. 09/610,738. This client computer 85 can function independently or together with other similar client computers 85.

As described herein, storage operations may be performed by one or more media agents 105 at the direction of a storage manager 100 via the storage manager 100 or directly in communication with a client 85. Employing multiple media agents 105 in a storage system allows flexibility in associating one or more media agents 105 with a client 85, or other component. For example, one media agent 105 may be associated with a first client 85 and perform storage operations in regard to the associated client 85, e.g., using a primary copy of the first client 85, and another media agent 105 may be associated with a second client 85 and perform storage operations in regard with the second client 85, e.g., using a replication copy 200 of the second client 85. Thus, in the event that one or more system components fails or is unavailable, another system component, e.g., a media agent 105, may be used to perform a storage operation.

Figure 3:
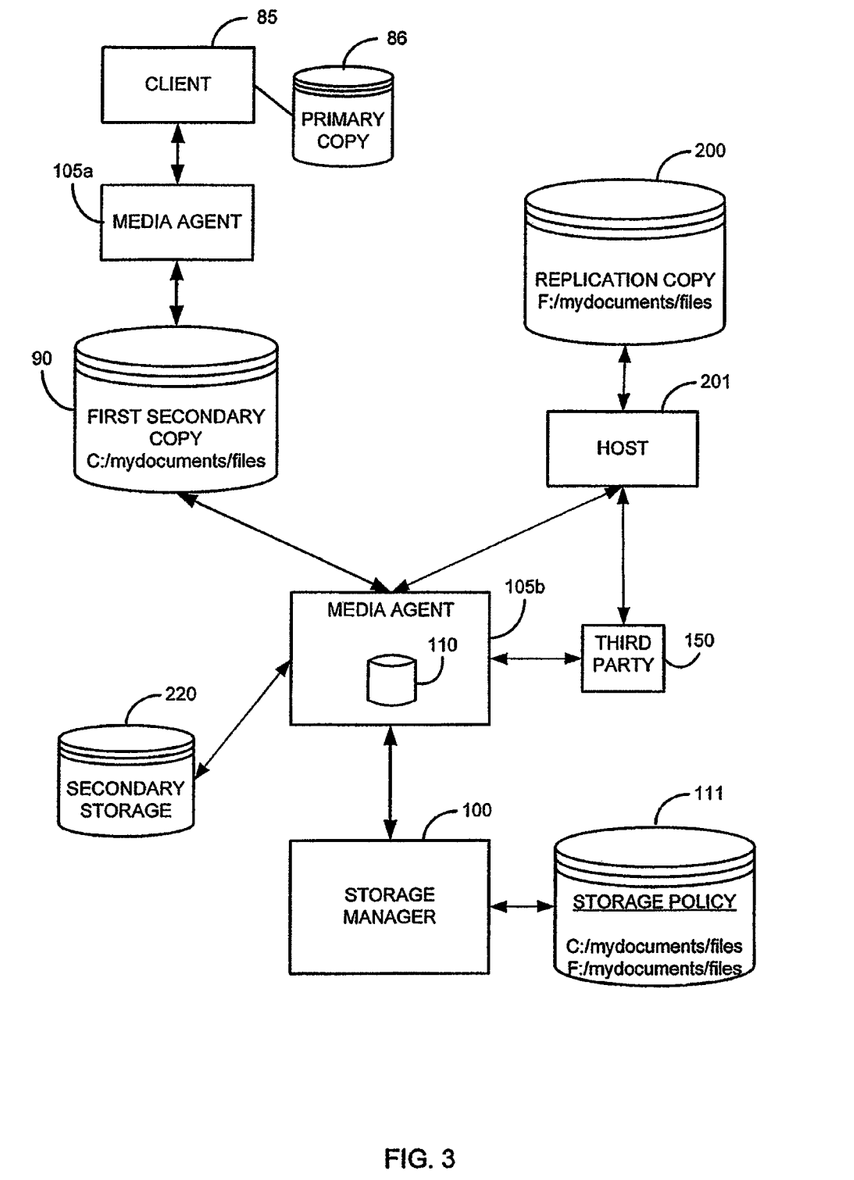
FIG. 3 is a high level block diagram of a storage management system according to an embodiment of the invention.

Referring to FIG. 3, a replication copy 200 of a first secondary copy 90 may be created by a third party application 150 or by cell components such as a media agent 105*b*, according to storage policies or at the direction of a storage manager 100. First secondary copy 90 is a first secondary copy or other initial copy of a primary copy 86 of data generated by client 85. First secondary copy 90 may be created via media agent 105*a* (which may be the same component as media agent 105*b*, or a separate component). As shown in FIG. 3, the replication copy 200 may be coupled to a media agent 105*b* and hosted by host 201. Media agent 105*b* or replication software on the first secondary copy 90 may be used to create replication copy 200, e.g., using known replication techniques. If the replication copy 200 is created by a third party application 150, the media agent 105*b* may interface with the third party application 150 to access the replication copy 200. The third party application 150 may be a software module which may communicate with a media agent 105 and replication copy 200. The media agent 105 may access the replication copy 200 to perform storage operations, such as creating secondary copies stored to secondary storage 200. Although, the media agent 105 may access first secondary copy 90 to perform storage operations, such configuration is not ideal because first secondary copy 90 is preferably free for use by other system components and for other storage operations.

One storage operation that the media agent 105 may perform in connection with the replication copy 200 or first secondary copy 90 is creation of a secondary copy or other backup operation. The media agent 105 may create, in accordance with a storage policy, a secondary copy 220 that may be created using data of a replication copy 200 or first secondary copy 90. In general, a secondary copy 220, such as an auxiliary copy, backup copy, or other copy, is stored to media that is slower than media used to store a first secondary copy 90 and the secondary copy 220 may be created to migrate electronic data to storage, such as at an offsite facility.

A storage policy stored in an index or database 110 or 111 may initiate a secondary copy operation and the media agent 105 may determine which copy to use for the copy operation. For example, the media agent 105 may check network and cell resources, storage policies, job scheduling or other storage characteristic to determine whether the first secondary copy 90 or replication copy 200 should be used. For example, a media agent 105 (or storage manager, jobs agent or other system component) may consult a job schedule, such as a storage operation schedule 250 depicted in FIG. 4. The storage operation schedule 250 may include a schedule or timeline for storage operations performed, currently in operation or scheduled in the future. Information about storage operation scheduling may be obtained from a storage policy, communicated from one or more system components, or provided by a system user or administrator.

In addition, preferences as to use of a replication copy, first secondary copy or other source data may be established for performing a storage operation, for example, in a storage policy or other preference associated with one or more cells, system components, scheduling policy, retention policy, or other preference. A user may set a preference or other criteria which may be used to select a replication copy or first secondary copy to perform a storage operation, or alternatively, a default template setting in a storage policy or other selection criteria, or a user preference may be that new media added to a storage device should use a replication copy in performing a storage operation, or a particular cell may include a client for which a replication copy may be used to perform storage operations, or other storage preference or selection criteria.

Figure 4:
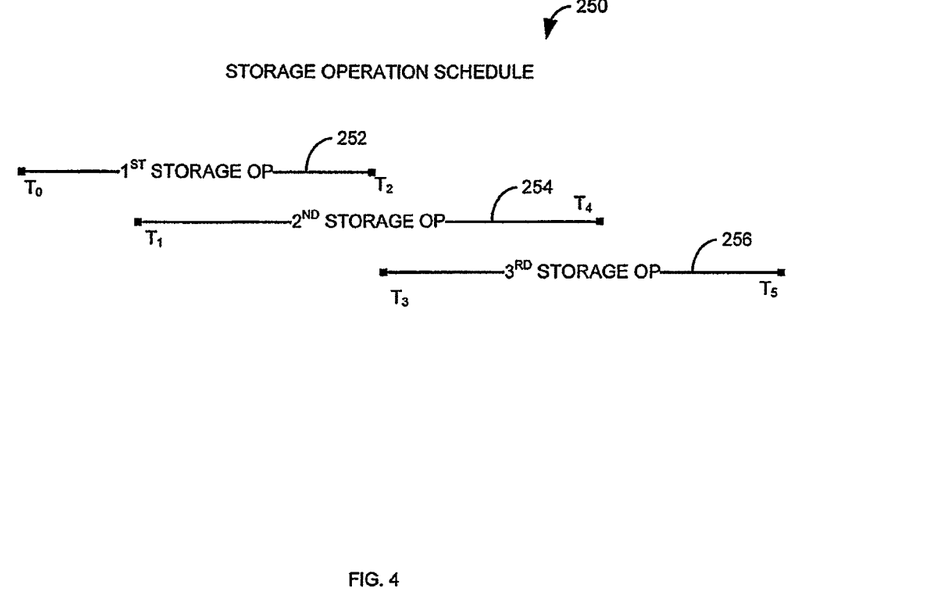
FIG. 4 is a storage operation schedule according to an embodiment of the invention.

As shown, a first storage operation 252 may be scheduled to occur from T.sub.0 to T.sub.2. The first storage operation 252 may be any storage operation and may be associated with a storage policy, storage preference or other criteria which may indicate a preference for using or selecting a first secondary copy or a replication copy to perform the storage operation. During the time period T.sub.0 and T.sub.2, a second storage operation 254 is scheduled to occur from T.sub.1 to T.sub.4. The second storage operation 254 may also be associated with a storage policy or storage preference regarding a copy to use to perform the storage operation. Overlapping with the second storage operation 254, a third storage operation 256 is scheduled for T.sub.3 to T.sub.5. As with the first and second storage operations 252 and 254, respectively, the third storage operation 256 may be associated with one or more storage preferences or a storage policy. Such storage preferences may also include a relative priority weighting for performing the storage operation, and a priority weighting for using a particular copy for performing the storage operation, such as the first secondary copy or replication copy. Weighting each storage preference provides the ability to calculate an overall metric for selection of one or more aspects of performing the storage operation.

A storage manager, jobs agent, media agent or other system component, may consult the storage operation schedule 250 and/or an index to identify criteria for selecting a data source, or determine a priority of or availability to use a first secondary copy or a replication copy for a storage operation. For example, the first storage operation 252 may be associated with a storage preference that indicates that a first secondary copy or a replication copy may be used to perform a storage operation, and have a medium priority level. The second storage operation 254 may be associated with a storage preference that indicates that a first secondary copy is preferably used to perform a storage operation and it has a higher priority than first storage operation 252. The third storage operation 256 may be associated with a storage preference which indicates that a first secondary copy is preferably used to perform a storage operation and has a medium priority level. In such a case, the storage manager (or jobs agent, media agent or other system component) may automatically select a replication copy for performing the first storage operation 252, and a first secondary copy for performing the second storage operation 254. The storage manager may calculate the storage operation priority, other preferences and first secondary copy availability and override the data source preference with respect to the third storage operation 256 and select or allocate the replication copy for use in performing the third storage operation 256 based on selection criteria, for example, the higher priority weighting of the second storage operation 254 and the availability of the first secondary copy which will be in use in the second storage operation 254 at the time the third storage operation 256 is to be initiated.

A media agent 105 may consult a database table in its index 110 or a storage manager index 111 to identify a replication copy 200 that corresponds to a first secondary copy 90. An example of such database table may be the table 305 depicted in FIG. 5. As shown, table 305 includes information useful in performing storage operations, such as network pathways for primary copies 320 and corresponding replication copies 310. For example, first secondary copy 325 at c:/mydocuments/files corresponds to replication copy 345 at F:/mydocuments/files. First secondary copy 330 at c:/programfiles/files, however does not have a corresponding replication copy as shown by the empty record, 350. First secondary copy 335 at c:/database/files corresponds to g:/database/files 355. The table 305 may also include other information about the first secondary copies 320 and replication copies 310 such as a system component associated with each, media type, storage type, data content, data type, or other information. In addition, table 305 may include links or relational pointers between a production data set, primary copy, first secondary copy and a replication copy.

As described herein, using a replication copy to perform a storage operation, which may otherwise be performed using a first secondary copy, frees up the first secondary copy, and any system components that may be associated with the first secondary copy, for other uses. For example, a first media agent may be associated with a particular client and its respective data agent, data store or first secondary copy, and a second media agent may be associated with the same client and a replication copy associated with the client. In this case, the first secondary copy may be used to perform storage operations or other operations in connection with the first media agent, data agent or client, and concurrently, the replication copy could be used by the second media agent to perform a secondary copy operation or other storage operation.

Figure 5:
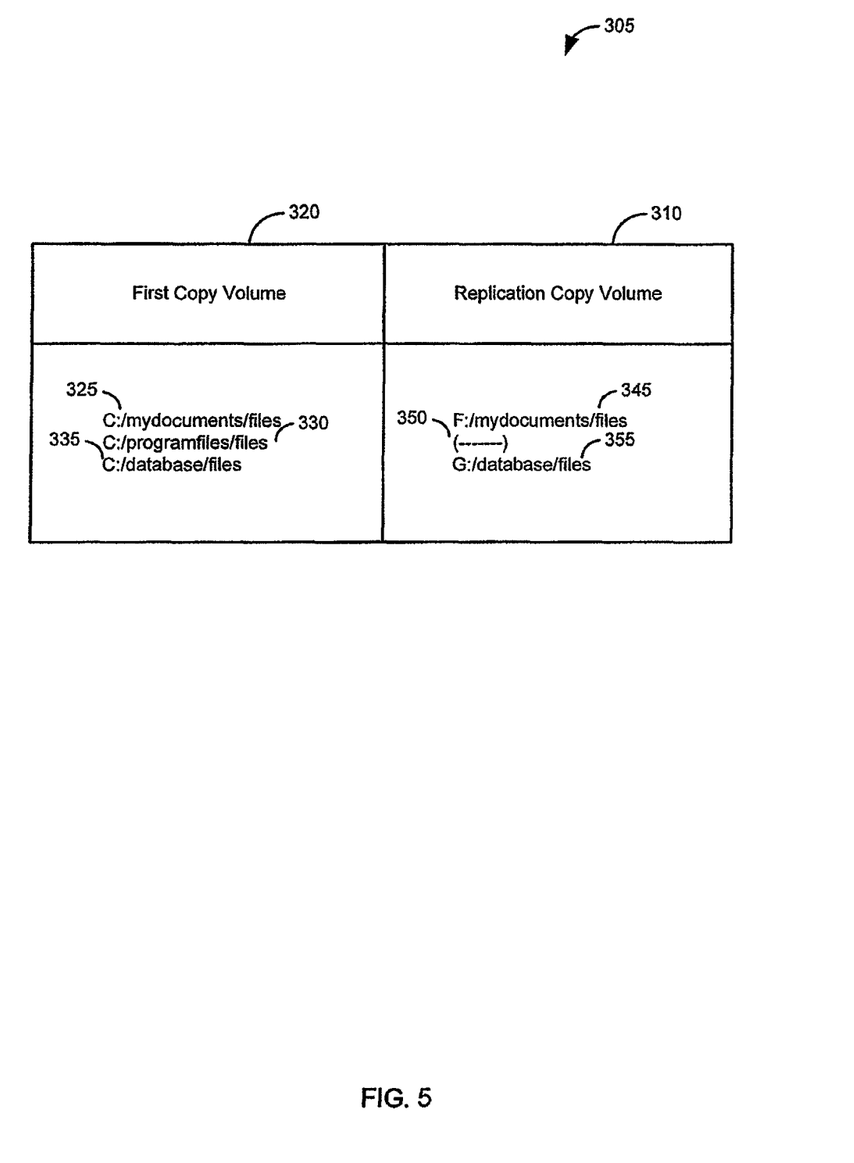
FIG. 5 is a database table for tracking copy volumes according to an embodiment of the invention.
Figure 6:
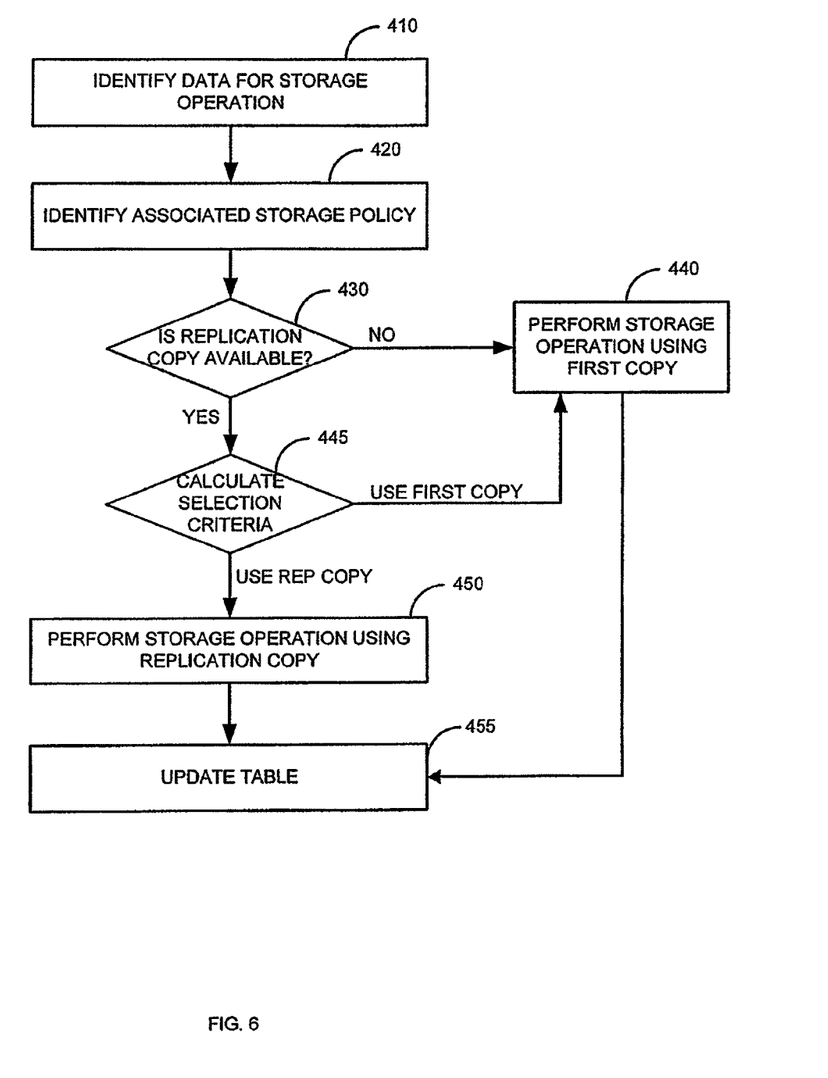
FIG. 6 is a flow diagram of a method for performing a storage operation according to an embodiment of the invention.

A media agent or other system component may update a table regarding replication copy information, such as the table depicted in FIG. 5, and direct a storage operation according to the flow diagram depicted in FIG. 6. The table provides a convenient reference point for cell components to identify a replication copy associations or information about cell components. The table may be updated continuously as information about a replication copy becomes known to a media agent, storage manager or other cell component, such as a client.

A storage operation request may be received, such as a request to create a secondary copy or other which may include information for identifying data for performing a storage operation, step 410. The storage operation request may be user initiated or automatically initiated in accordance with a storage policy, job schedule, retention policy or other initiator. The storage operation request may include, among other information, data identifying the first secondary copy or corresponding client having source or production data to be used in the storage operation.

A storage policy may be identified that is associated with the data for performing the storage operation, step 420. In general, the storage policy is associated in an index or data table with a data source, such as a client, sub-client, or other system component or data classification. The storage policy may include one or more storage preferences which may indicate a priority for performing a storage operation, one or more criteria for selecting a component, data item, or data source with which to perform a storage operation, or other preference. The storage policy may be user defined, a default template, or other set of preferences.

A storage manager, media agent or other system component may determine whether a replication copy of data is available to perform a storage operation, step 430. In general, the replication copy information may be obtained by a media agent (or other component) by consulting a table, index or database to determine whether there is a replication copy that is associated with a first secondary copy of data targets, such as the identified data for performing the storage operation. Generally, the media agent will check the table for a replication copy if a storage preference or a user preference indicates that a replication copy should be used. However, even if the storage preference does not indicate that a replication copy should be used, a storage policy may have a default setting such that a media agent should determine whether to use a first secondary copy or replication copy in accordance with optimizing system resources, such as, for example, in accordance with availability of system components and network pathways, job scheduling, or other system characteristics, as described herein. Thus, a media agent may check for a replication copy whether or not a storage preference dictates use of a replication copy.

Availability of the replication copy may also include a determination that the replication copy is online or offline, the replication copy is in use for another storage operation, or otherwise available or unavailable. In addition to consulting the table to check for availability, a media agent may ping or communicate with the replication copy to determine if it is online and available.

In the event that no replication copy exists, a media agent or storage manager may direct the storage operation to be performed using a first secondary copy, step 440. Upon performance of the storage operation, the index is updated to reflect the completed storage operation, step 455. The index may be updated to include information about the completed storage operation, such as creation of a secondary copy, and information about the data source, e.g., the first secondary copy.

The media agent or storage manager may also determine whether a lack of a replication copy of data is causing inefficiencies in performing storage operations and may direct that in view of future storage operations, scheduled, or anticipated, for example, based on a storage policy, that a replication copy be produced for all, or particular types or data. For example, a replication copy may be created using a third party application, which may be interfaced directly by a media agent, or alternatively created by the media agent, replication agent, or other systems and methods described herein or known in the art.

If a replication copy exists, e.g., the media agent consults a table and finds a replication copy which is associated with a first secondary copy that is the data source for the storage operation, the media agent (or other system component) may calculate a selection criteria, step 445, for selecting a data source to perform the storage operation. For example, as described herein, a storage operation priority, storage preference, criteria, or other basis may be used to select a replication copy or first secondary copy to perform a storage operation. In one example, a first storage operation may be performed using a first secondary copy, step 440, if a selection criteria indicates that a first secondary copy should be used. For example, a criteria that a storage operation is a high priority storage operation, or concurrent storage operation scheduling, or other criteria, may cause a storage manager to select a first secondary copy to be used for a particular storage operation. In another example, a second storage operation having a medium priority which can use a replication copy may be performed using a replication copy, step 450.

In both scenarios, information about the completed storage operation may be stored to an index, step 455. Although a replication copy may have been used to create a secondary copy, the index may be updated with data indicating that a primary copy or a first secondary copy was used to create a secondary copy. Such an index entry is useful in the event that other components or modules may not recognize that a replication copy as an appropriate data source for creating a secondary copy, which may cause an error or other system failure.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing a storage operation using a replication copy, the method comprising:
   receiving indication that a storage operation should be performed on a first set of data stored on a first storage volume;
   determining with at least computer hardware that a replication copy is available on a second storage volume, the replication copy comprises a second set of data that is a copy of at least a portion of the first set of data;
   automatically selecting with the computer hardware, the replication copy to perform the storage operation;
   performing with the computer hardware, the storage operation on the second set of data associated with the replication copy on the second storage volume rather than the first set of data on the first storage volume, based on the availability of the replication copy; and
   creating a third set of data based on performing the storage operation on the second set of data.

2. The method of claim 1 additionally comprising updating an index to indicate completion of the storage operation.

3. The method of claim 2 wherein the updating comprises modifying the index to indicate that the storage operation was performed on the first set of data after the storage operation was performed on the replication copy.

4. The method of claim 1 additionally comprising generating the second set of data by creating a copy of the first set of data, wherein the first set of data comprises production data associated with a particular software application.

5. The method of claim 1 additionally comprising monitoring changes to the first set of data with a filter driver.

6. The method of claim 1 wherein generating the second set of data comprises processing a log file containing a least a portion of the changes monitored by a filter driver.

7. The method of claim 1 additionally comprising generating the replication copy via a snapshot operation.

8. The method of claim 1 additionally comprising generating the replication copy via a mirroring operation.

9. The method of claim 1 additionally comprising performing a second storage operation on the first set of data, wherein the second storage operation at least partially overlaps the first storage operation on the second set of data.

10. The method of claim 1 wherein determining that a replication copy is available further comprises determining if the replication copy is online or offline.

11. A storage management system configured to perform storage operations, the storage management system comprising:
   a first storage device that stores a first set of data;
   a second storage device that stores a replication copy, the replication copy comprises a second set of data that is a copy of at least a portion of the first set of data:
   a storage manager comprising at least computer hardware that determines whether a replication copy is available on a second storage volume;
   wherein the storage manager directs the automatic selection of the replication copy to perform of the storage operation
   wherein the storage manager directs performance of the storage operation on the second set of data associated with the replication copy on the second storage volume rather than the first set of data on the first storage volume, based on the availability of the replication copy; and
   create a third set of data based on performing the storage operation on the second set of data.

12. The system of claim 11, wherein the storage manager further directs an update to an index to indicate completion of the storage operation.

13. The system of claim 12 wherein the update comprises modifying the index to indicate that the storage operation was performed on the first set of data after the storage operation was performed on the replication copy.

14. The system of claim 11 wherein the storage manager generates the second set of data by creating a copy of the first set of data, wherein the first set of data comprises production data associated with a particular software application.

15. The system of claim 11 wherein the storage manager further monitors changes to the first set of data with a filter driver.

16. The system of claim 11 wherein the storage manager further directs the generation of the second set of data by processing a log file containing a least a portion of the changes monitored by a filter driver.

17. The system of claim 11 wherein the storage manager further directs generation of the replication copy via a snapshot operation.

18. The system of claim 11 wherein the storage manager further directs generation of the replication copy via a mirroring operation.

19. The system of claim 11 wherein the storage manager directs the performance of a second storage operation on the first set of data, wherein the second storage operation at least partially overlaps the first storage operation on the second set of data.

20. The system of claim 11 wherein determining that a replication copy is available further comprises determining if the replication copy is online or offline.

* * * * *

UNITED STATES PATENT AND TRADEMARK OFFICE
CERTIFICATE OF CORRECTION

PATENT NO. : 8,935,210 B2
APPLICATION NO. : 14/261789
DATED : January 13, 2015
INVENTOR(S) : Rajiv Kottomtharayil It is certified that error appears in the above-identified patent and that said Letters Patent is hereby corrected as shown below:

On the title page,

In column 2, page 6, item 56, line 10, under Other Publications, please change "Mangement" to -- Management --.

In the claims,

In column 13, line 37, in Claim 6, please change "a least" to -- at least --.

In column 14, line 36, in Claim 16, please change "a least" to -- at least --.

Signed and Sealed this
Seventeenth Day of May, 2016

Michelle K. Lee
*Director of the United States Patent and Trademark Office*